(12) United States Patent
Marko et al.

(10) Patent No.: US 6,284,009 B1
(45) Date of Patent: Sep. 4, 2001

(54) SELF-ALIGNING COMPONENT SUPPORT SYSTEM FOR A VEHICLE

(75) Inventors: Kenneth M. Marko, Corinth; Michael B. Montgomery, Sanger, both of TX (US); Rob A. Cook, Conrad, MT (US)

(73) Assignee: Paccar INC, Bellevue, WA (US)

( * ) Notice: Subject to any disclaimer, the term of this patent is extended or adjusted under 35 U.S.C. 154(b) by 0 days.

(21) Appl. No.: 09/491,940

(22) Filed: Jan. 26, 2000

(51) Int. Cl.⁷ .................................................. B01D 46/10
(52) U.S. Cl. .......................... 55/385.3; 55/490; 55/501; 55/DIG. 28; 123/198 E
(58) Field of Search ............................ 55/385.1, 385.2, 55/385.3, 490, 497, 501, 503, DIG. 28, 506, 519, DIG. 30; 123/198 E

(56) References Cited

U.S. PATENT DOCUMENTS

| | | | | |
|---|---|---|---|---|
| 4,440,555 | * | 4/1984 | Chichester | 55/385.3 |
| 5,427,582 | * | 6/1995 | Hudson | 55/385.3 |
| 5,433,772 | * | 7/1995 | Sikora | 55/385.3 |
| 5,649,986 | * | 7/1997 | Mueller | 55/385.3 |
| 5,913,295 | * | 6/1999 | Sadr et al. | 55/385.3 |
| 5,921,214 | * | 7/1999 | Fujita et al. | 55/385.3 |

* cited by examiner

*Primary Examiner*—David A. Simmons
*Assistant Examiner*—Minh-Chau T. Pham
(74) *Attorney, Agent, or Firm*—Sidley Austin Brown & Wood

(57) ABSTRACT

A component support system for a vehicle provides a way to firmly attach a component to a vehicle. The component support system includes a component member adapted to attach to the component to be mounted and a support member adapted to attach to the vehicle. The component member has a first mating surface with a first channel formed thereon. The support member has a second mating surface with a second channel formed thereon. The second channel is adapted to interfit with the first channel. Because the channel configurations are non-symmetric about an axis allowing the parts to interfit in only one orientation, the component support system is self-aligning. A fastener is adapted to retain the component member against the support member when the first channel is interfitted with the second channel.

28 Claims, 4 Drawing Sheets

US 6,284,009 B1

SELF-ALIGNING COMPONENT SUPPORT SYSTEM FOR A VEHICLE

TECHNICAL FIELD OF THE INVENTION

The present invention relates to a component support system for a vehicle. In one aspect, it relates to a component support system having two pieces that interfit with each other so as to be self-aligning and are held together by a fastener.

BACKGROUND OF THE INVENTION

There are many commonly known support and fastening systems for supporting vehicle components, especially underhood vehicle components such as an air cleaner housing, a vacuum canister, a fluid reservoir, a fuse box, an electrical component, a sensor, a wiring harness, a battery housing, a compressor, a pump, an air intake manifold for a ventilation system, and the like. But, many of these commonly known vehicle component support systems have disadvantages in their design. For example, some vehicle component support systems utilize multiple attachment points, with each point requiring installation of one or more bolts or screws. This can make alignment for installation difficult and installation of a component a time consuming and labor intensive process. Also, it is often necessary to gain access to other components located behind or beneath the component. It is therefore desirable to provide a fastening system that can be easily removed to access other components located behind or beneath the component. Hence, a need exists for a component support system that provides both rapid and easy installation, as well as rapid and easy removal of a component for access to other components located behind or beneath the component.

Furthermore, many of the commonly known component support systems cannot provide firm support for the component while also being easy to align for installation, while also having a small number of attachment points, while also having a small number of parts, or while not occupying a lot of space. Thus, there is a need for a component support system that is compact, easy to align for installation, has few attachment points, and has a low part content while also providing firm support for the component.

SUMMARY OF THE INVENTION

Many of the needs outlined above are addressed by the present invention hereof. It is an object of the present invention to provide a component support system for quickly removing or installing a component.

It is another object of the present invention to provide a component support system that provides firm support for a component while also being easy to align, having few attachment points, having a small number of parts, and not taking up a lot of space.

In accordance with one aspect of the present invention, a component support system is provided for supporting a component on a vehicle. The component support system comprises a component member adapted to attach to the component to be mounted and a support member adapted to attach to the vehicle. The component member has a first mating surface with a first channel formed thereon. The first channel may be a male channel integrally formed on the first mating surface and may have a U-shaped configuration when viewed normal to the first mating surface. In addition, the first channel may have tapered ends and may have a generally U-shaped cross-section. The support member has a second mating surface, which is adapted to mate with the first mating surface when the parts are juxtaposed. A second channel is formed on the second mating surface. The second channel is adapted to closely interfit with the first channel. The second channel may be a female channel integrally formed on the second mating surface and may have a U-shaped configuration when viewed normal to the second mating surface. Additionally, the second channel may have tapered ends and may have a generally U-shaped cross-section. A fastener is provided to retain the component member against the support member when the first channel is interfitted with the second channel. A slot may be formed in the component member that is adapted to receive the fastener. The fastener may comprise a stud attached to the support member and a nut. In such fastener, the nut is adapted to interlock with the stud and to capture the slotted portion of the component member against the support member. Alternatively, the fastener may be a clip, a latch, a screw, a strap, or some combination thereof.

In accordance with a preferred embodiment of the present invention, a system for supporting an air cleaner housing on a vehicle is provided.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

Figure 2:
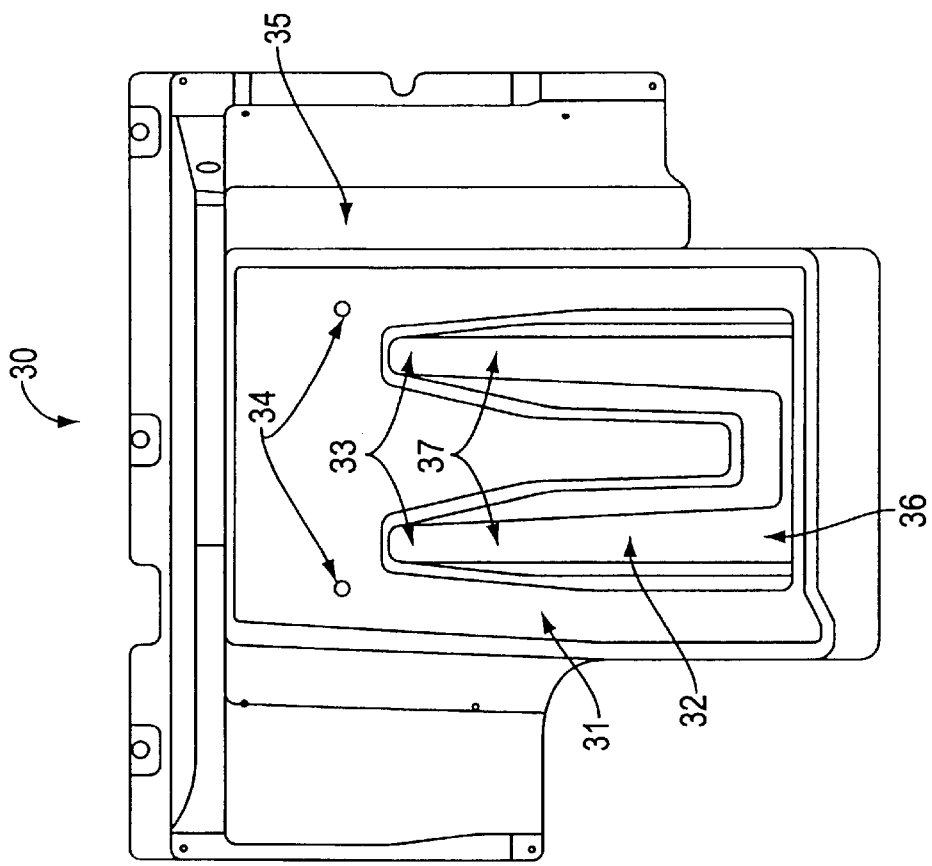
FIG. 2 is a front view of a support member according to the preferred embodiment of the present invention.

Referring now to the drawings, wherein like reference numbers are used to designate like elements throughout the various views, a preferred embodiment as well as other possible embodiments and modifications are further described.

The present invention is a component support system for a vehicle. The particular component could be any of a variety of vehicle components, especially underhood components such as an air cleaner housing, a vacuum canister, a fluid reservoir, a fuse box, an electrical component, a sensor, a wiring harness, a battery housing, a compressor, a pump, an air intake manifold for a ventilation system, and the like.

Figure 1:
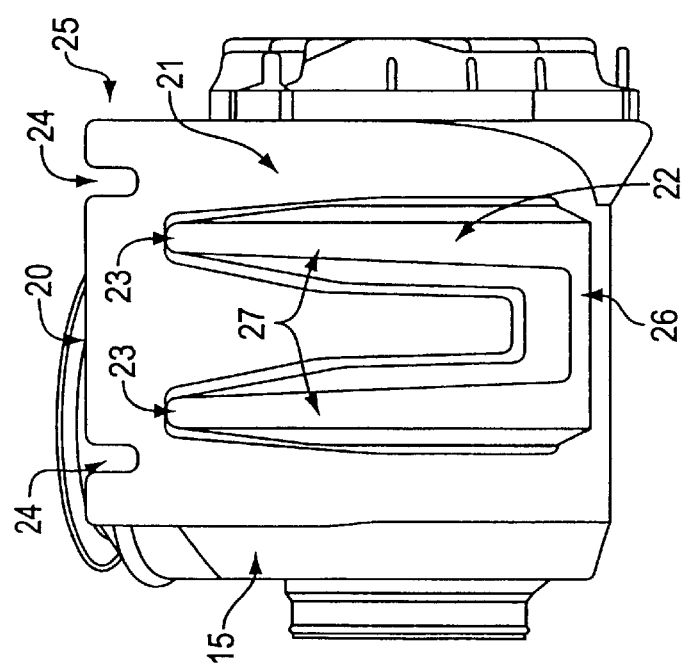
FIG. 1 is a rear view of a component, in this case an air cleaner housing, incorporating a component member according to a preferred embodiment of the present invention.
Figure 3:
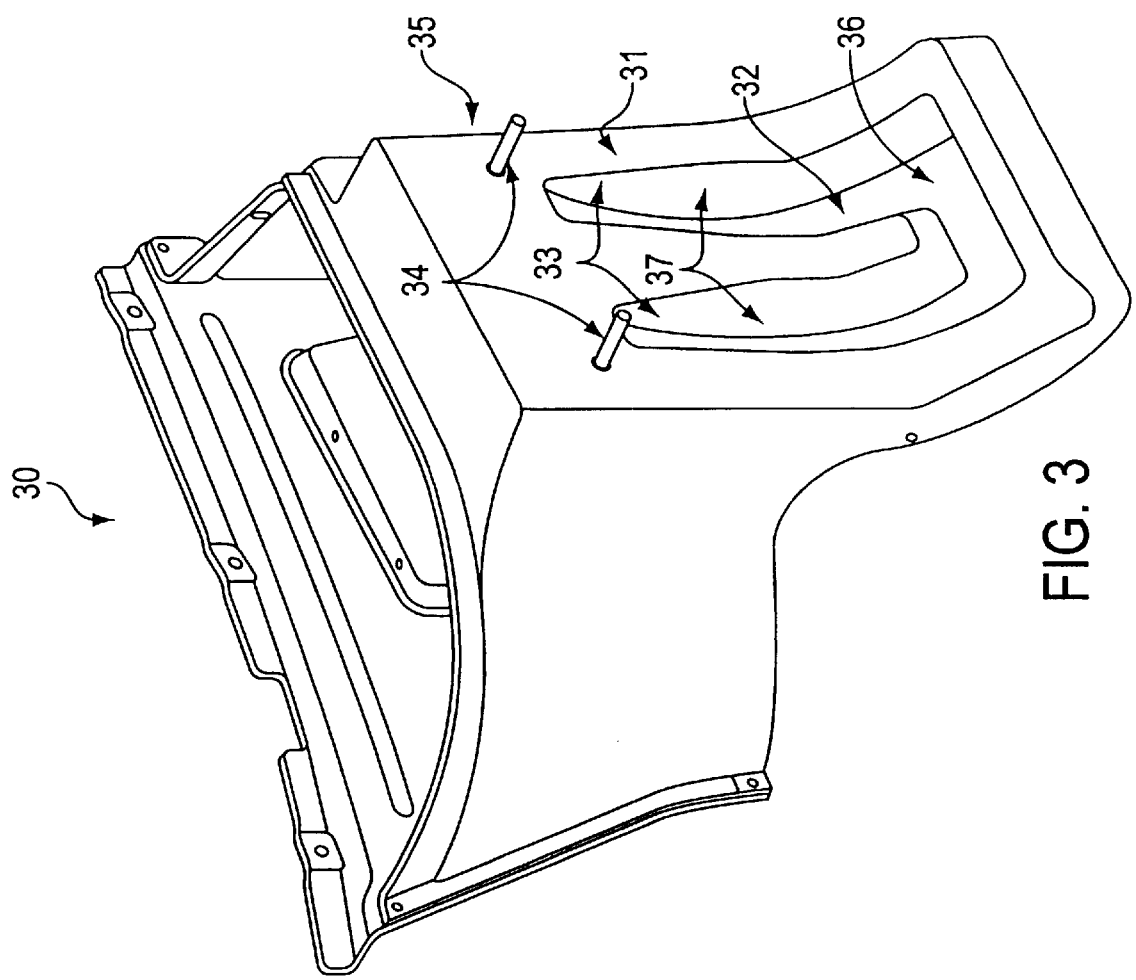
FIG. 3 is an isometric view of the support member of FIG. 2.
Figure 4:
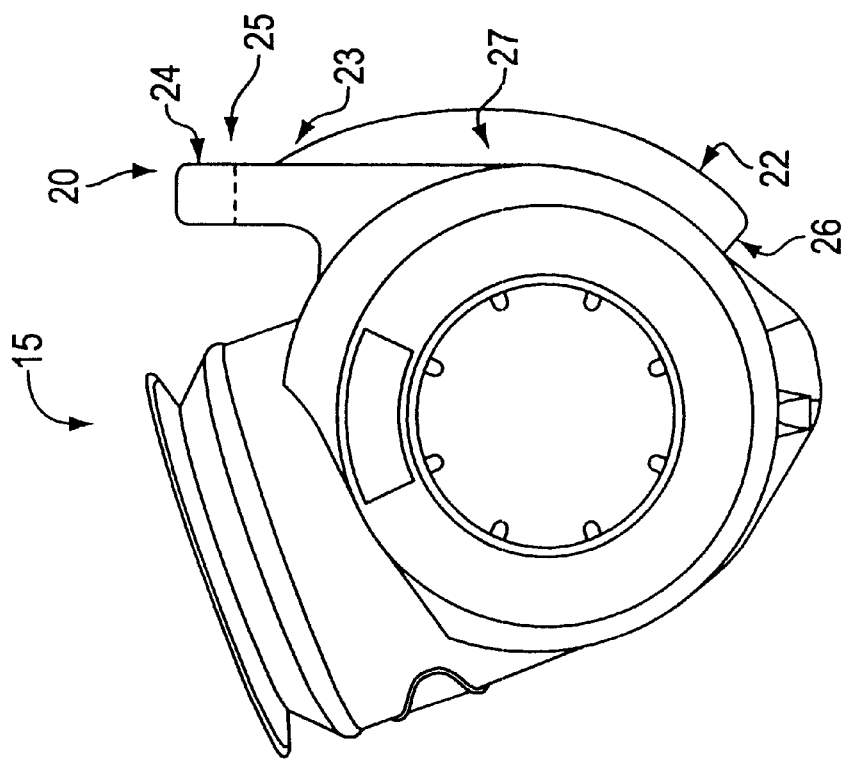
FIG. 4 is a side view of the air cleaner housing of FIG. 1.

FIGS. 1–6 show various views and various portions of a component support system according to a preferred embodiment of the present invention in which the component 15 being mounted is an air cleaner housing. The component support system comprises a component member 20 adapted to attach to the component 15 to be mounted and a support member 30 adapted to attach to the vehicle. Each of the component member 20 and support member 30 may be a separate article that is mounted on its respective component or vehicle, or they may be integrally formed as a part of the component or vehicle. FIGS. 1 and 4 show an air cleaner housing 15 that is designed to contain an air cleaner for a vehicle, as well as to route intake air through the air cleaner. The air cleaner housing 15 incorporates the component member 20 formed as an integral part thereof. The component member 20 has a first mating surface 21 formed on its backside. A male channel 22 is integrally formed on the first mating surface 21, and the male channel protrudes rearward from the backside of the component member 20. The male channel 22 has a U-shaped configuration when viewed normal to the first mating surface 21. Preferably, the male channel 22 has tapered distal ends 23 and a generally U-shaped cross-section. Also, the component member 20 has two slots 24 formed therein at an upper portion 25 thereof and proximate to the male channel 22.

Figure 5:
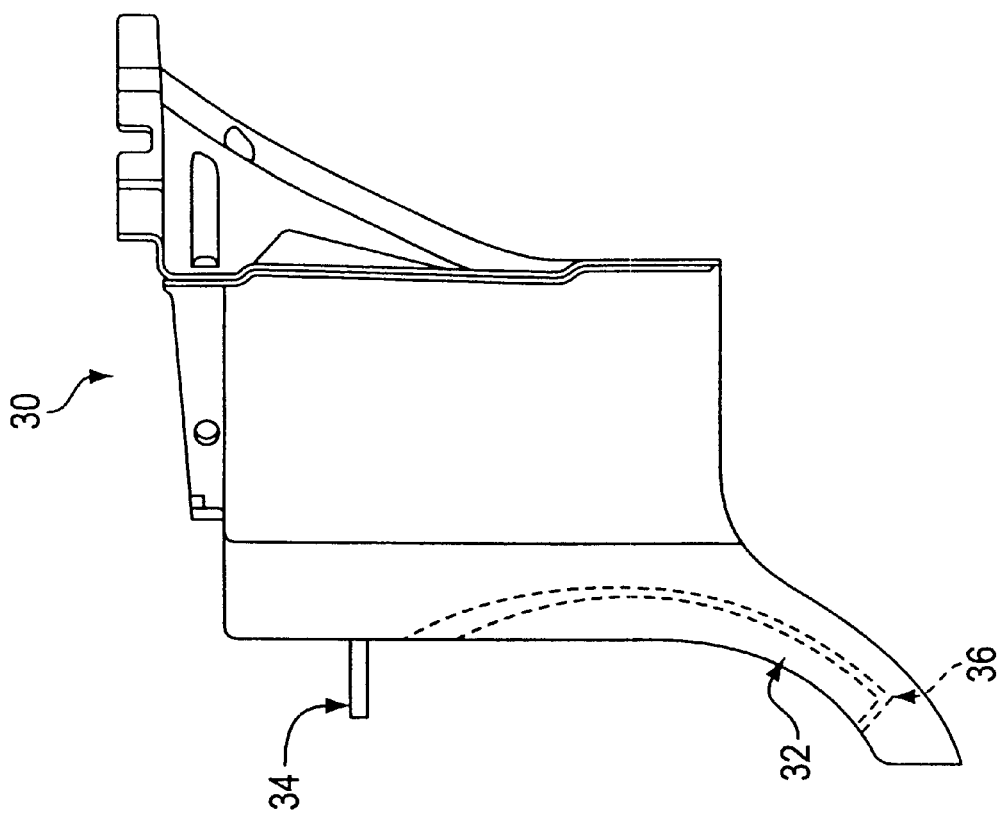
FIG. 5 is a side view of the support member of FIGS. 2 and 3.

FIGS. 2, 3, and 5 show a support member 30 that is designed to provide support and a mounting location for attaching the air cleaner housing 15 to a vehicle (not shown). The support member 30 can be a separate article that can be mounted on the vehicle or it can be an integral part of another component of the vehicle. The support member 30 has a second mating surface 31 formed on the front side thereof. The second mating surface 31 is adapted to mate with the first mating surface 21 of the component member 20 when the two parts are juxtaposed so that the component member 20 can flushly mount on the support member 30. A female channel 32 is integrally formed on the second mating surface 31, and the female channel projects into the front side of the support member 30. The female channel 32 has a U-shaped configuration when viewed normal to the second mating surface 31. Preferably, the female channel 32 has tapered distal ends 33 and a generally U-shaped cross-section corresponding to the ends and cross-section of the male channel 22. In addition, the support member 30 has two studs 34 attached thereto at an upper portion 35 of the support member and proximate to the female channel 32. The studs 34 protrude outward from the front side of the support member 30.

Figure 6:
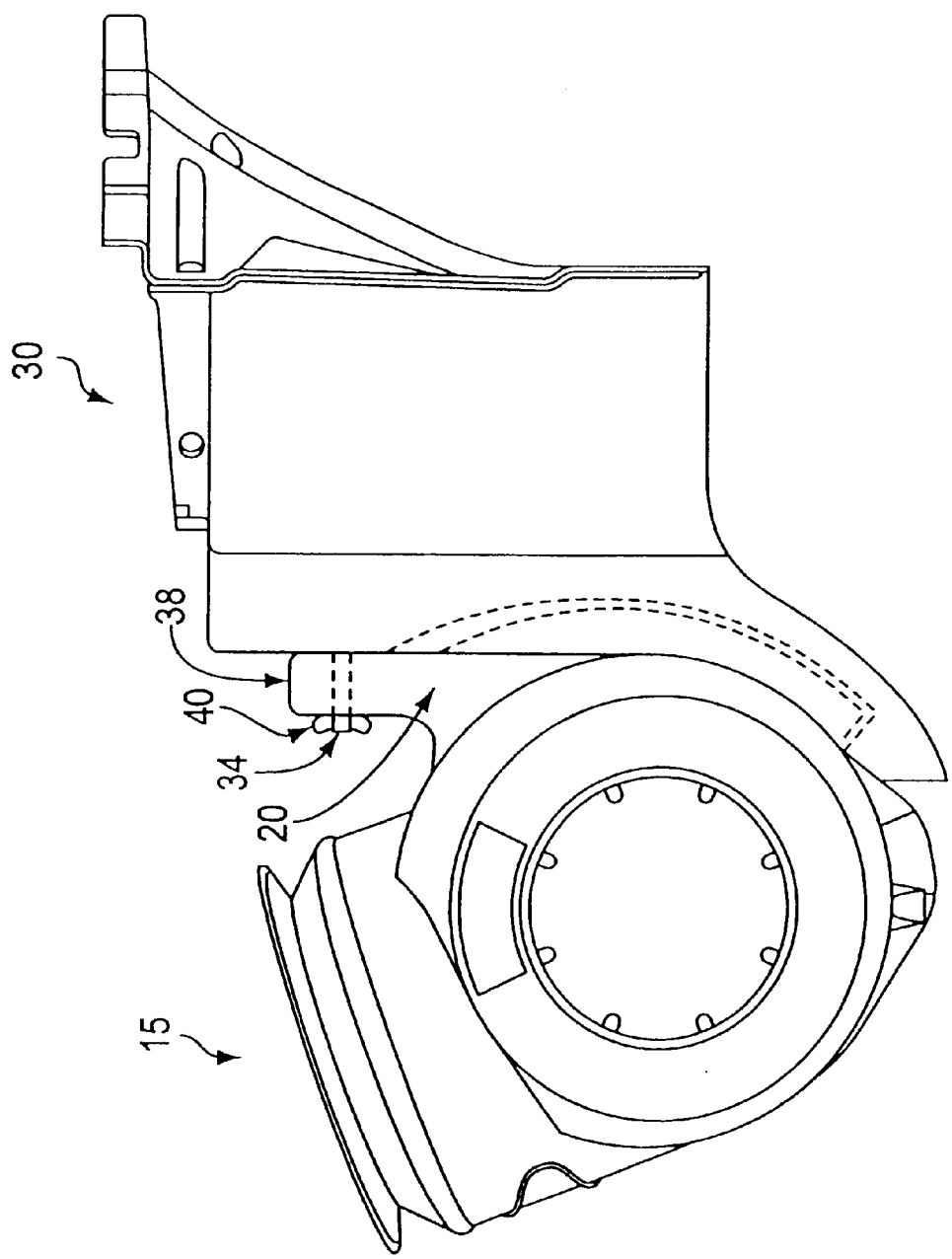
FIG. 6 is a side view of the air cleaner housing and the support member of FIGS. 1–5 shown in a mated configuration.

As best seen in FIG. 6, the male channel 22 of the component member 20 is adapted to interfit with the female channel 32 of the support member 30. The slots 24 of the component member 20 are adapted to receive the studs 34 of the support member 30. When the component member 20 is mated with the support member 30, the studs 34 project through the slots 24, as shown in FIG. 6. Two nuts 40 (only one nut shown in FIG. 6) are adapted to interlock with the studs 34. When the component member 20 is mated with the support member 30, as in FIG. 6, the two nuts 40 can be used to retain the component member against the support member. Each nut 40 has a width greater than the width of each slot 24. While the preferred embodiment shown comprises a fastener 38 including two studs 34 and two nuts 40, it will be readily apparent that a fastener including a single stud and nut is also within the scope of the present invention.

Due to the geometric configuration of the bottom portions 26, 36, respectively, of the male and female channels 22, 32 the component member 20 and air cleaner housing 15 cannot slide downward relative to the support member 30 when mated with the support member. Also, the vertical extending portions 27, 37, respectively, of the male and female channels 22, 32 (see FIGS. 1 and 2) prevent lateral and rotational movement of the component member 20 and air cleaner housing 15 relative to the support member 30 when the parts are mated. Hence, the stud and nut fastener 38 primarily prevents the air cleaner housing 20 from sliding upward and outward away from the support member 30. The channels 22, 32 provide most of the lateral and rotational support, and they support most of the weight of the air cleaner housing 15.

The simplicity of the present invention minimizes the part content required to firmly support the air cleanser housing 15 to the support member 30. removal of the air cleaner housing 15 from the support member 30 is performed easily by removing the nuts 40. Alignment and installation of the air cleaner housing 15 onto the support member 30 is also easily performed by inserting the male channel 22 into the female channel 32. Due to the U-shaped configuration of the channels 22, 32, the component member 20 interfits with the suppor member 30 in only one orientation, and thus the system is self-aligning. Also, the tapered ends 23, 33, respectively, of the channels 22, 32 aid in alignment during intallation.

In the preferred embodiment, as best seen in FIG. 5, the support member 30 has a curved contour when viewed in a direction parallel with the bottom portion 36 of the female channel 32. The component member 20 also has a curved contour that substantially matches the contour of the support member 30. This allows the component member 20 to flushly interface with the support member 30 when they are mated together. This flush interface design reduces the space required for the component support system. Also, the flush interface helps to more firmly secure the component member 20 against the support member 30 by providing contact around a greater portion of the component's periphery. Furthermore, the flush interface between the component member 20 and the support member 30 distributes the load of the air cleaner housing 15 over a larger area of the support member. This load distribution allows the support member 30 to be designed with thinner walls, and thus less material for a lighter part. Also, the channels 22, 32 act as structural members that stiffen or strengthen the component member 20 and support member 30 at the mating surfaces 21, 31, which also allows for the use of thinner and/or lighter materials. Weight reduction is often a desirable design criteria for vehicles.

Other possible embodiments of the present invention may have other variations. For example, the fastener 38 may have only one stud and one nut adapted to interconnect with one slot. A stud could be attached to the component member 20, and a slot could be formed in the support member 30. The fastener 38 could also be any of a variety of commonly known fasteners, including but not limited to: a clip, a latch, a screw, a strap, or some combination thereof. The channels 22, 32 may have various other shapes, other than having a U-shaped configuration, being non-symmetric about an axis to allow an interfit at only one orientation, and that will perform the same functions and provide similar results. The cross-section shape of the channels 22, 32 may have various shapes, other than being generally U-shaped, including but not limited to being: rounded concave/convex, generally square shaped, or V-shaped. The channels 22, 32 may or may not be integrally formed in the component member 20 or support member 30. Instead, one or both channels 22, 32 can be separate pieces affixed to the component member 20 or support member 30.

It will be appreciated by those skilled in the art having the benefit of this disclosure that this invention provides a component support system for a vehicle. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A component support system for a vehicle, comprising:
   component member having a first mating surface;
   a first channel feature formed on said first mating surface;
   a support member having a second mating surface, said second mating surface being adapted to mate with said first mating surface when juxtaposed therewith;
   a second channel feature formed on said second mating surface, said second channel being adapted to interfit with said first channel; and
   a fastener adapted to retain said component member against said support member when said first channel is interfitted with said second channel.

2. A component support system in accordance with claim 1, wherein said first and second channels have a non-symmetric configuration such that said first channel will only interfit with said second channel in a predetermined alignment.

3. A component support system in accordance with claim 1, wherein said first channel forms a U-shaped configuration on said first mating surface and said second channel forms a U-shaped configuration on said second mating surface.

4. A component support system in accordance with claim 1, wherein said first channel has tapered ends and said second channel has tapered ends.

5. A component support system in accordance with claim 1, wherein said first channel is one of a male or female channel, and said second channel is the other of said male or female channel.

6. A component support system in accordance with claim 1, wherein said first channel has a U-shaped cross-section and said second channel has a U-shaped cross-section.

7. A component support system in accordance with claim 1, wherein said first channel is integrally formed in said component member and said second channel is integrally formed in said support member.

8. A component support system in accordance with claim 1, further comprising a slot formed in said component member, and wherein said fastener comprises a stud and a nut, said stud being attached to said support member and protruding therefrom, said slot being adapted to receive said stud, said nut being adapted to interlock with said stud, and said nut being adapted to capture said component member against said support member.

9. An air cleaner housing support system for a vehicle, comprising:
   an air cleaner housing having a first channel formed thereon;
   a support member having a second channel formed thereon, said second channel being adapted to interfit with said first channel; and
   a fastener adapted to retain said air cleaner housing against said support member when said first channel is interfitted with said second channel.

10. An air cleaner housing support system in accordance with claim 9, wherein said first and second channels have a non-symmetric configuration such that said first channel will only interfit with said second channel in a predetermined alignment.

11. An air cleaner housing support system in accordance with claim 9, wherein said first channel forms a U-shaped configuration on an exterior surface of said air cleaner housing, and said second channel forms a U-shaped configuration on an exterior surface of said support member.

12. An air cleaner housing support system in accordance with claim 9, wherein said first channel has tapered ends and said second channel has tapered ends.

13. An air cleaner housing support system in accordance with claim 9, wherein said first channel is one of a male or female channel, and said second channel is the other of said male or female channel.

14. An air cleaner housing support system in accordance with claim 9, wherein said first channel has a U-shaped cross-section and said second channel has a U-shaped cross-section.

15. An air cleaner housing support system in accordance with claim 9, wherein said first channel is integrally formed in said air cleaner housing and said second channel is integrally formed in said support member.

16. An air cleaner housing support system in accordance with claim 9, further comprising a slot formed in said air cleaner housing, and wherein said fastener comprises a stud and a nut, said stud being attached to said support member and protruding therefrom, said slot being adapted to receive said stud, said nut being adapted to interlock with said stud, and said nut being adapted to capture said air cleaner housing against said support member.

17. An air cleaner housing support system in accordance with claim 9, wherein said air cleaner housing has a curved contour along an outside surface adapted to interface with said support member, said support member has a curved contour along an outside surface adapted to interface with said air cleaner housing, and said curved contour of said support member substantially matches said curved contour of said air cleaner housing such that said air cleaner housing flushly interfaces with said support member when said air cleaner housing is installed on said support member.

18. An air cleaner housing support system for a vehicle, comprising:
   an air cleaner housing having a first mating surface;
   a male channel integrally formed on said first mating surface;
   a support member having a second mating surface, said second mating surface being adapted to mate with said first mating surface when juxtaposed therewith;
   a female channel integrally formed on said second mating surface, said male channel being adapted to mate said female channel in only one predetermined alignment;
   at least one stud attached to said support member and protruding therefrom;
   at least one slot formed in said air cleaner housing, said at least one slot being adapted to receive said at least one stud; and
   at least one nut, said at least one nut being adapted to interlock with said at least one stud, and said at least one nut being adapted to capture said air cleaner housing against said support member when said male channel is mated with said female channel.

19. An air cleaner housing support system in accordance with claim 18, wherein said first mating surface has a curved contour, said second mating surface has a curved contour, and said curved contour of said second mating surface substantially matches said curved contour of said first mating surface such that said air cleaner housing flushly interfaces with said support member when said air cleaner housing is installed on said support member.

20. An air cleaner housing support system in accordance with claim 18, wherein said male channel forms a U-shaped configuration on said first mating surface and said female channel forms a U-shaped configuration on said second mating surface.

21. An air cleaner housing support system in accordance with claim 18, wherein said male channel has tapered ends and said female channel has tapered ends.

22. An air cleaner housing support system in accordance with claim 18, wherein said male channel has a U-shaped cross-section and said female channel has a U-shaped cross-section.

23. A component support system for a vehicle, comprising:
   a component member having a first mating surface;
   a first channel feature formed on said first mating surface;
   a support member having a second mating surface, said second mating surface being adapted to mate with said first mating surface when juxtaposed therewith;
   a second channel feature formed on said second mating surface, said second channel having a non-symmetrical shape adapted to guide said first channel into a predetermined vertical, lateral and rotational alignment relative to said second channel; and
   a fastener adapted to retain said component member against said support member when said first channel is in said predetermined alignment relative to said second channel.

24. A component support system in accordance with claim 23, wherein said non-symmetrical shape of said second channel is a U-shaped depression formed on said second mating surface.

25. A component support system in accordance with claim 24, wherein said first channel is a protrusion formed on said first mating surface having a contour which substantially matches a contour of said non-symmetric shape of said second channel.

26. A component support system in accordance with claim 23, wherein said non-symmetrical shape of said second channel is a U-shaped protrusion formed on said second mating surface.

27. A component support system in accordance with claim 26, wherein said first channel is a depression formed on said first mating surface having a contour which substantially matches a contour of said non-symmetric shape of said second channel.

28. A component support system in accordance with claim 23, further comprising a slot formed in said component member, and wherein said fastener comprises a stud and a nut, said stud being attached to said support member and protruding therefrom, said slot being adapted to receive said stud, said nut being adapted to interlock with said stud, and said nut being adapted to capture said component member against said support member.

\* \* \* \* \*

UNITED STATES PATENT AND TRADEMARK OFFICE
CERTIFICATE OF CORRECTION

PATENT NO. : 6,284,009 B1
DATED : September 4, 2001
INVENTOR(S) : Kenneth M. Marko et al.

It is certified that error appears in the above-identified patent and that said Letters Patent is hereby corrected as shown below:

<u>Column 4,</u>
Line 7, delete "removal", insert -- Removal --.
Line 14, delete "suppor", insert -- support --.

<u>Column 5,</u>
Line 11, before "component member", insert -- a --.

Signed and Sealed this

Twenty-first Day of May, 2002

Attest:

Attesting Officer

JAMES E. ROGAN
*Director of the United States Patent and Trademark Office*